United States Patent [19]

Gubela

[11] Patent Number: 4,769,084
[45] Date of Patent: Sep. 6, 1988

[54] SYNTHETIC CHEMICAL ADSORBENTS

[76] Inventor: Hans-Erich Gubela, Hundeberg 17, D 7595 Sasbachwalden, Fed. Rep. of Germany

[21] Appl. No.: 86,502

[22] Filed: Aug. 18, 1987

Related U.S. Application Data

[63] Continuation of Ser. No. 525,612, Aug. 22, 1983, abandoned, which is a continuation-in-part of Ser. No. 266,346, May 22, 1981, abandoned.

[30] Foreign Application Priority Data

May 22, 1980 [DE] Fed. Rep. of Germany ....... 3019550
Apr. 15, 1981 [DE] Fed. Rep. of Germany ....... 3115172

[51] Int. Cl.$^4$ ............................................. B08B 7/00
[52] U.S. Cl. ........................................ 134/7; 210/660; 210/682; 210/690; 210/502.1; 210/924
[58] Field of Search ..................... 210/502.1, 660, 681, 210/682, 690, 692, 924; 134/4, 7; 429/204

[56] References Cited

U.S. PATENT DOCUMENTS

| | | | |
|---|---|---|---|
| 3,591,422 | 7/1971 | Bernholtz | 429/204 |
| 3,617,565 | 11/1971 | Fahlvik | 210/924 |
| 3,862,963 | 1/1975 | Hoshi | 210/502 |
| 3,912,635 | 10/1975 | Degobert | 210/924 |
| 4,056,112 | 11/1977 | Calmon | 134/7 |
| 4,111,813 | 9/1978 | Preus | 210/924 |
| 4,169,052 | 9/1979 | Bocard | 134/7 |
| 4,197,204 | 4/1980 | Mathes | 210/924 |
| 4,210,460 | 7/1980 | Seidenberger | 134/7 |
| 4,274,960 | 6/1981 | Abrahamsson | 210/924 |
| 4,366,067 | 12/1982 | Golding | 210/924 |
| 4,383,868 | 5/1983 | Braley | 134/7 |

OTHER PUBLICATIONS

Baier, et al., Universal Gelling Agent for the Control of Hazardous Liquid Spills, Journal of Hazardous Materials, vol. 1, 1975/6 pp. 21-23.
Wheatley Foam Plastic Insulation for High Temperature and Shock Protection, U.S. Atomic Energy Commission, Jul. 1968, pp. 1-25.
Mallet, "Development of Foam Plastic as High Temperature Insulation and Shock Absorbent Lining For UF$_6$ Packages", Nuclear Engineering and Design 5(1967) pp. 98-106.

Primary Examiner—Ernest G. Therkorn
Attorney, Agent, or Firm—Michael J. Striker

[57] ABSTRACT

A method is disclosed for absorbing bases, acids, alcohols and radioactive liquids using phenol resin foamed plastic particles. The size of the particles should lie between about 0.3 and 3 mm. The particles are initially closed-celled, but have been powdered or fine flaked. They may be treated with an acid for absorbing a base, or with a base for absorbing an acid. A preferred use is in the form of packing material. The particles may be disposed in the form of powder or flakes in liquid-permeable padding. The padding may be composed of a plastic web, in particular a nylon web, or of a non-woven fabric. As packing material the phenol resin foamed plastic may be in the form of sheets, blocks, cubes, tablets, balls or fragments.

3 Claims, 2 Drawing Sheets

SYNTHETIC CHEMICAL ADSORBENTS

This is a continuation of application Ser. No. 525,612, filed Aug. 22, 1983, which is in turn a continuation-in-part of Ser. No. 266,346, filed on May 22, 1981, both now abandoned.

BACKGROUND OF THE INVENTION

The use of porous, hardened synthetic resin plastics obtained through the condensation of aminoplastic- or phenoplastically-formed compounds and aldehydes for the cleaning of organic solvents, which had been used as wash liquid for textile fabrics, is known from German patent DE-PS No. 1 132 545. For this purpose, the foamed plastic acts as a filter, which absorbs the grease, odorous substances and finishing preparations washed by these solvents from the fabrics, but not the solvent cleaning agents themselves, in particular carbon tetrachloride, trichloroethylene, tetrachloroethylene, benzol or benzene.

It has also already been suggest to use ground formaldehyde resin or phenol resin foamed plastic for the absorbing and binding of oil, benzene, fat or other such chemical substances.

For purposes of catastrophe protection and other such necessary cases, to prevent acids or bases from doing harm, acids for example will be treated with sodium carbonate and thereby neutralized. This treatment with sodium carbonate makes it possible in many cases to add too much soda, whereby an excess of chemical caustic is then present. The neutralized product is bound by means of inorganic substances having high suction capacity. These inorganic substances with high suction capacity resulting from their containing a plurality of fine porous cells are e.g. perlite, kieselguhr or vermiculite. The treating of a base with an acid or an acid with a base requires in addition to knowledge of chemical procedures, a great deal of caution and accuracy, so that no dangerous reactions occur. Various products appear, depending on the chemicals to be neutralized, including dangerous or hazardous fumes.

Until now, neutralization or setting of hazardous acids and bases by inorganic high porosity materials, such as the mentioned perlite, kieselguhr or vermiculite, have the further disadvantages that these materials cannot be destroyed or are destroyed only with great difficulty, since they are not combustible at customary combustion temperatures, in particular being not combustible without residue. Thus, upon their subsequent storage or deposition the material, furthermore containing absorbed substances, as a result of the effect of water upon the substances which were initially absorbed, releases these substances whereby an additional danger is present.

The present invention is thus based upon the problem of selecting a chemical adsorbent which with an extremely high absorbing volume harmlessly takes up and unbinds acids and bases and at the same time may be destroyed through combustion practically free of residue.

SUMMARY OF THE INVENTION

In order to solve this problem, the use of phenol resin foamed plastic particles is proposed for the absorption of base, alcohol, and radioactive liquid and acid spillages. In addition to liquids, they can also treat such constituents which are otherwise absorbable or adherable in the foamed plastic particles. Phenol resin foamed plastic has the capacity of absorbing and binding a large plurality of various bases and caustics to a high degree, without thereby becoming corroded to such a degree that the absorbing capacity or retaining capacity of the absorbing material suffers. The acids or bases can be of both inorganic or organic types. The phenol resin foamed plastic is also excellently suitable for the absorbing of alcohols, and even for holding radioactive liquids. A homogeneous substance is accordingly capable of safely absorbing and retaining various liquids.

The phenol resin foamed plastic is initially provided as a body, i.e., block or similar mass, with closed cells. It is milled into a powder or fine flakes. The grain size should come to between 0.25 and 3 mm, referably between 0.5 and 2 mm.

A result of the milling operation is an at least partial destruction of the closed cells. The absorption capacity does not depend upon a collecting, or trapping of a liquid in connected hollow spaces, as is the case with a sponge or with open-celled foamed plastic. Instead, the absorption effect follows through an addition to the surfaces by means of attractive forces which are sufficiently provided only by phenol resin foam. The absorbed liquid does not travel from one cell to another, which would be disadvantageous. By means of the milling operation of the closed cells, a very great amount of surfaces is obtained. Substantially more surfaces are obtained in this manner than by the milling of open-celled phenol resin foamed plastic.

The invention thus operates not according to a principle of absorption as with a sponge, but rather according to the principle of depositing on as many surfaces as possible, i.e., in effect a sort of adsorption.

An additional advantage of the phenol resin foamed plastic particles in accordance with the present invention is that they do not swell and possess a high degree of durability. Moreover, the phenol resin foamed plastic particles are stable against the most different types of materials to be taken up. The terms absorbing and absorption, as employed herein, are meant to be understood in their broadest sense, i.e., taking up, subject to the mechanism involved according to the present invention as set forth above and distinguished from a mere sponge-like effect.

In accordance with a particular embodiment of the present invention, it is suggested that a phenol resin foamed plastic for adsorbing a base be treated with an acid or be provided with accumulated acid particles, whereas a phenol resin foamed plastic destined for absorbing an acid should be treated with a base or display basic elements in its hollow spaces, so that the neutralization of the mentioned substances occurs with or within the foamed plastic. Thus a phenol resin powder or granulate for an acid neutralization in particular, is advantageously mixed with a calcium carbonate.

In a further embodiment according to the present invention, it is suggested that the mentioned phenol resin foamed plastic particles be used as packing material.

According to an additional embodiment of the present invention, the phenol resin foamed plastic particles in the form of powder or flakes are disposed in liquid-permeable padding, which is composed of a plastic web, in particular a nylon web, or a non-woven fabric. In order to demonstrate the adsorbing effect of the fine-flaked phenol resin foamed plastic at room temperature in relation to particular substances and solutions, one gram of the test material is weighted into an Erlenmeyer flask (size 250 ml). Subsequently, 10 ml of the absorbed liquids using as a basis a bulk density of the chemical binder of 0.15 kg per liter.

TABLE 1

| Liquid Tested | Material Group or Component | Absorbing Effectiveness[1] per liter RAPID | Absorbing Effectiveness[1] per kg RAPID | Evaluated according to Storage Time of 48 Hours State | Evaluated according to Storage Time of 48 Hours Color |
| --- | --- | --- | --- | --- | --- |
| Paint Remover | Chlorohydrocarbon/Alcohol | * | * | solid | light ochre |
| Acetaldehyde | Aldehyde | 1.49 1[2] | 7.95 kg[2] | dry | light rose |
| Acetone | Ketone | 1.14 1 | 6.01 kg | dry | light red |
| Ammonia, conc. | Caustic | 1.19 1 | 7.21 kg | moist | brown |
| Ammonia, dil. | Caustic | 1.11 1 | 7.10 kg | dry | light brown |
| Aniline | Amine | 1.05 1 | 7.15 kg | dry | brown |
| Paint, white | Binding Agent, Pigment, Solvent | * | * | moist | white |
| Benzoyl chloride | Acid chloride | 0.99 1 | 8.04 kg | moist | wine red |
| Butylene glycol | Polyalcohol | 1.05 1 | 7.17 kg | moist | dark red |
| Butylamine | Amine | 1.14 1 | 5.63 kg | dry | light yellow |
| Chloroform | Chlorohydrocarbon | 1.05 1 | 10.41 kg | dry | unchanged |
| Diethylether | Ether | 1.22 1 | 5.96 kg | dry | unchanged |
| Printing ink, black | Pigment, Solvent | * | * | moist | black |
| Acetic acid, conc. (glacial) | Organic acid | 1.05 1 | 7.24 kg | moist | unchanged |
| Ethyl alcohol | Alcohol | 1.13 1 | 6.06 kg | dry | dark yellow |
| Fixing bath | Salt solution | 1.04 1 | 6.93 kg | moist | light brown |
| Photo developer | Organic salt solution | 1.05 1 | 6.99 kg | moist | brown |
| Glycol | (Poly)-alcohol | 0.95 1 | 7.04 kg | moist | unchanged |
| Soda lye | Caustic | 1.29 1 | 12.61 kg | moist | dark brown |
| Phosphoric acid (85%) | Inorganic acid | 1.13 1 | 12.87 kg | moist | unchanged |
| Pyridine | Organic base | 1.04 1 | 6.81 kg | moist | brown |
| Hydrochloric acid, conc. | Inorganic acid | 0.99 1 | 7.42 kg | moist | unchanged |
| Hydrochloric acid, dil. | Inorganic acid | 0.99 1 | 6.92 kg | moist | unchanged |
| Sulfuric acid, conc. | Inorganic acid | 1.23 1 | 15.09 kg | moist | black |
| Sulfuric acid, dil. (10%) | Inorganic acid | 0.96 1 | 6.84 kg | moist | unchanged |
| Styrene | Plastic resin, monomeric | 0.92 1 | 5.56 kg | moist | dark red |
| Softening agent | Ester | * | * | moist | unchanged |

*Qualitative Evaluation: Absorbing effectiveness is present upon thickening of the mixture of chemical binder and liquid to be tested. The mixture is removed by mechanical means (e.g. blade).
[1]Evaluated 5 minutes after addition
[2]Upon addition of acetaldehyde there followed heating (up to about 35° C.) and gas formation liquid to be absorbed is added and simultaneously dispersed. After a standing period of 5 minutes, the contents of the Erlenmeyer flask are poured onto a wire screen web. The non-absorbed portion of the liquid will drip off. After a drainage period of two minutes, the non-absorbed liquid portion is measured. After dripping off of the non-absorbed portion of the liquid, the loaded chemical binder is removed by auxiliary mechanical means (e.g., a blade). With higher viscosity liquids, identified in following Table 1 by an asterisk, a volume measurement was impractical. In these cases the addition of the liquid to be tested followed according to weight (10 g liquid to 1 g chemical binder) and only a qualitative valuation of the absorbing effect was undertaken. With these materials it was also necessary to obtain a simultaneous mixing with the chemical binder through mechanical distribution with a spatula.

In each case the chemical binder, soaked with the respective test liquid, was evaluated with regard to color and quality after a storage period of 48 hours at room temperature in open vessels.

The test results are sumamrized in the following table.

The conversion of the test results presented in Table 1 into volume and mass figures was done with the aid of literature statements concerning the packing of the The test results show that the chemical binder of powdered phenol resin foamed plastic has a high absorbing and binding capacity in relation to bases and caustics, alcohols and esters, as well as solvents and salt solutions.

The phenol resin foamed plastic to be powdered can be in the form of closed cells, since upon pulverization the cell borders of the pulverized portion will be opened.

The grain size of the phenol resin foam particles is practicable within the range of about 0.25 to 3.0 mm; thereunder should also be understood fragments, pieces, bars or sheets.

The phenol resin foamed plastic particles are not required to be powdered. They may be cut as sheets or bars.

Small balls may also be considered for use, in particular hollow balls of phenol resin, which are characterized also as micro-balloons (flasks).

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
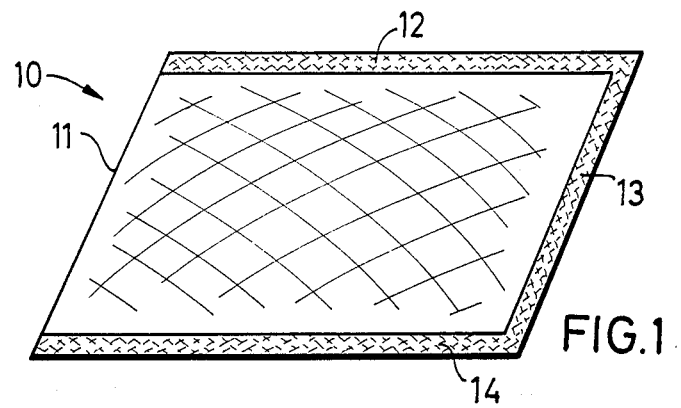
FIG. 1 is a perspective representative of a padding.

According to FIG. 1 the padding 10 is composed of two layers of a nylon web or a fleece, which is turned up about edge 11, and in which the borders 12, 13, and 14 are bound. When dealing with a web of plastic, the binding of the borders follows advantageously through the use of pressure and heat. When dealing with a fleece, the binding of the borders follows preferably through use of adhesives. Insides these two layers a powdered or flake-formed phenol resin foamed plastic is present.

Figure 2:
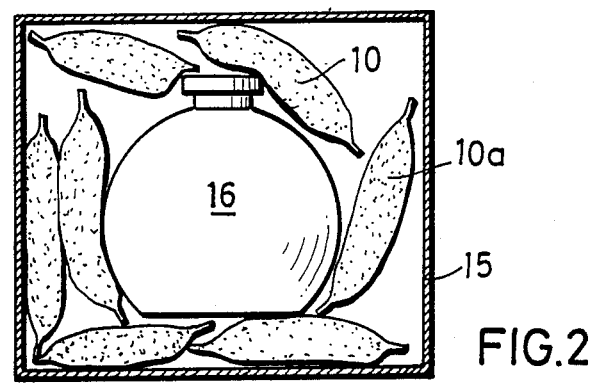
FIG. 2 shows a packing schematically in vertical section.

FIG. 2 shows a container 15 with a flask 16, in which for example hydrofluoric acid is disposed. Inside the container 15 the flask 16 is packed and protected by a plurality of paddings 10, 10a containing the phenol derivative.

Figure 3:
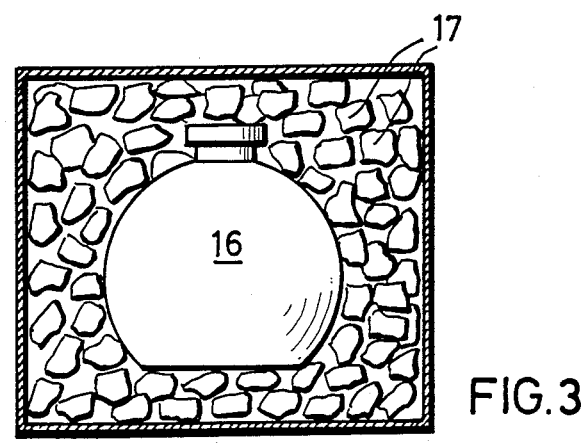
FIG. 3 shows another packing in vertical section.

In FIG. 3 the flask, which for example contains a plant-protection agent, is packed and secured by particles 17 of the phenol resin foamed plastic.

Figure 4:
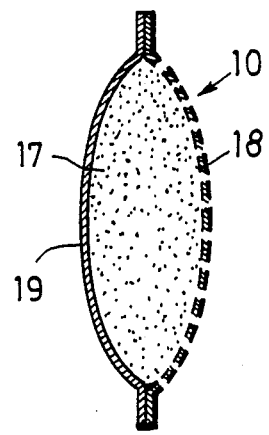
FIG. 4 shows another padding in vertical section.

According to FIG. 4 the padding is composed of two layers 18 and 19, wherein the layer 18, facing the material to be packed, is liquid permeable.

Figure 5:
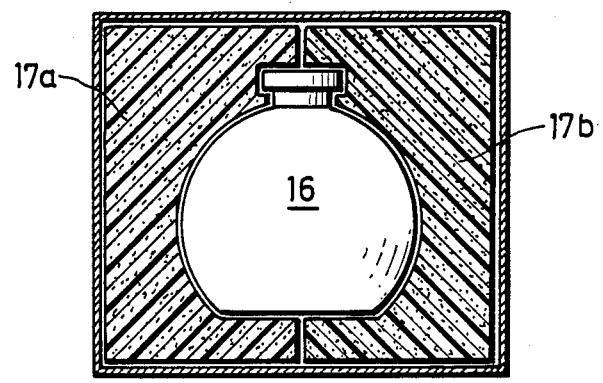
FIG. 5 shows another packing in vertical section.

FIG. 5 shows a packing material as shaped bodies adapted in form to the material to be packed.

It will be understood that each of the elements described above or two or more together, may also find a useful application in other types of adsorbents differing from the types described above.

While the invention has been illustrated and described as embodied in a phenol resin foamed plastic adsorbent, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. Method of absorbing base, acid, alcohol or radioactive liquid spillages comprising contacting said base, acid, alcohol or radioactive liquid spillages with phenol resin foamed close-celled plastic particles, said particles having been milled into a powder of fine flakes so as to thereby at least partially destroy their closed cells.

2. Method according to claim 1, wherein said phenol resin foamed closed-celled particles display a grain size between about 0.3 and 3 mm.

3. Method according to claim 1, wherein said phenol resin foamed closed-celled particles display a grain size between about 0.5 and 2 mm.

* * * * *